United States Patent [19]

Haenen et al.

[11] 4,354,200
[45] Oct. 12, 1982

[54] AMPLITUDE MODULATOR CIRCUIT FOR MODULATING A VIDEO SIGNAL ON A CARRIER SIGNAL

[75] Inventors: Henricus W. G. Haenen; Robertus S. N. M. Huesken, both of Eindhoven, Netherlands

[73] Assignee: U.S. Philips Corporation, New York, N.Y.

[21] Appl. No.: 214,941

[22] Filed: Dec. 10, 1980

[30] Foreign Application Priority Data

Dec. 20, 1979 [NL] Netherlands .......................... 7907177

[51] Int. Cl.$^3$ ............................................... H04N 5/40
[52] U.S. Cl. ...................................... 358/23; 329/163; 358/16; 358/24; 358/186
[58] Field of Search ...................... 358/16, 23, 186, 24; 329/163, 164

[56] References Cited

U.S. PATENT DOCUMENTS

2,793,348  5/1957  Hunter .............................. 358/24 X

Primary Examiner—Robert L. Richardson
Attorney, Agent, or Firm—Thomas A. Briody; William J. Streeter; Edward W. Goodman

[57] ABSTRACT

Amplitude modulator circuit for modulating a video signal on a carrier signal. A first control loop which is coupled to the output terminal of the modulator comprises a first sampling circuit which is active during reference signal portions for generating a direct current compensation signal which is added to the video signal. As a result thereof the signal at the modulation input terminal of the modulator obtains a value for which, during the sampling interval, the signal at the output terminals is substantially independent of the signal at the carrier input terminal. A second control loop which comprises a second sampling circuit which is active during reference signal portions, generates a second direct current compensation signal which is added to the signal at the output terminal. This eliminates an effect of a variation in the direct voltage level at the output terminal, while the circuit automatically eliminates substantially the effect of an unbalance in the modulator.

17 Claims, 6 Drawing Figures

AMPLITUDE MODULATOR CIRCUIT FOR MODULATING A VIDEO SIGNAL ON A CARRIER SIGNAL

BACKGROUND OF THE INVENTION

The invention relates to an amplitude modulator circuit for modulating a video signal having periodically occurring reference signal portions on a carrier signal, the circuit comprising a modulator having a carrier input terminal for receiving the carrier signal, a modulation input terminal for receiving the video signal and an output terminal for supplying the amplitude-modulated signal obtained, the circuit also comprising a control loop which is coupled to the output terminal of the modulator and which includes a sampling circuit which is active during reference signal intervals, said control loop generating a direct current compensation signal to be added to the video signal.

Such a modulator circuit must be of such a construction that the amplitude-modulated signal at the output terminal does not control a carrier signal in the time intervals in which the video signal has a reference value. To this end the video signal is usually brought to a fixed level, for example by means of a clamping circuit, this level corresponding to an output signal which does not contain a carrier. Such a technique is used in color encoding circuits for the NTSC or the PAL standards. The amplitude of the color sub-carrier must then be zero during the reference signal intervals.

In practice a carrier signal may however yet occur at the output terminal of the modulator during these intervals, which is, for example, caused by an asymmetry in the modulator, a direct current offset in the clamping circuit or variations caused by fluctuations in the supply voltage and/or the temperature. In encoding circuits, such an unbalance of the output signal is known as "sub-carrier leakage". This leakage can be eliminated for the greater part by designing the modulator circuit such that a relatively large modulating signal drives the modulator, as a result of which the fault is comparatively small. However, this requires a large power. Another possibility is an accurate adjustment of various portions of the circuit but such an adjustment is time-consuming, while the result thereof may again be susceptible to an unwanted variation with time.

Swiss Patent Specification 282.896 discloses a circuit in which a control loop produces a direct current compensation signal as a result of which signal portions can be brought to a predetermined level. This level must, however, be adjusted and may vary with time.

SUMMARY OF THE INVENTION

The invention has for its object to provide a circuit of the above-mentioned type in which the sub-carrier leakage is automatically reduced to a great extent and to this end the amplitude modulator circuit according to the invention is characterized in that the signal at the modulation input terminal of the modulator has a value for which the signal at the output terminal of the modulator is substantially independent of the signal at the carrier input terminal of the modulator during the period of time in which the sampling circuit is active, and that the circuit further comprises an adder stage connected to the output terminal and a second control loop which includes a second sampling circuit which is active during reference signal intervals, said second control loop generating a second direct current compensation signal to be added to the signal at the output terminal of the modulator and the said first control loop being connected to the output terminal of the adder stage.

The circuit according to the invention may be characterized in that the first control loop also comprises a comparison stage a first input terminal of which carries a reference signal, this comparison stage, having a second input terminal, and an output terminal is included in the first control loop, the reference signal having a value which is substantially equal to the value of the signal at the output terminal which is substantially independent of the signal at the carrier input terminal of the modulator. The circuit may further be characterized in that the signal at the carrier input terminal has at least during the period of time in which the sampling circuit is active a direct current level of such a polarity that the control loop causes a negative feedback.

According to the invention, the circuit is preferably characterized in that the first and the second sampling circuits are not simultaneously active. The circuit may be characterized in that the signal at the carrier input terminal has at least during the period of time in which the second sampling circuit is operative a second direct current level of such a polarity that the second control loop causes a negative feedback, the second direct current level deviating from the first direct current level.

According to the invention, the circuit may be characterized in that it comprises the second input terminal of the comparison stage is coupled to the output terminal of the adder stage, while the output terminal of the comparison stage is connected to the two sampling circuits. Both sampling circuits may be sample and hold circuits. The circuit may be characterized in that it comprises a second adder stage for adding a pulse-shaped measuring signal to the carrier signal during the period of time in which the first sampling circuit is operative, or a change-over switch for applying a direct current level to the carrier input terminal during the period of time in which the first sampling circuit is active and for applying the carrier signal to the said input terminal during the period of time in which the first sampling circuit is not active.

When the circuit according to the invention comprises a second amplitude modulator circuit for modulating a second video signal having periodically occurring reference signal portions on a second carrier signal and a second modulator having a second carrier input terminal for receiving the second carrier signal, a second modulation input terminal for receiving the second video signal and a second output terminal for supplying the second amplitude-modulated signal obtained and further a third adder stage for adding together the said first and second amplitude-modulated signals, then the circuit may be characterized in that it comprises a third control loop which is coupled to the second output terminal and includes a third sampling circuit which is active during reference signal intervals, said third control loop generating a third direct current composition signal to be added to the second video signal, the signal at the second modulation input terminal having a value for which the signal at the second output terminal is substantially independent of the signal at the second carrier input terminal during the period of time in which the third sampling circuit is active.

In this case the circuit according to the invention may be characterized in that it comprises a fourth adder stage connected to the second output terminal and a fourth control loop including a fourth sampling circuit which is active during reference signal intervals, said fourth control loop generating a fourth direct current compensation signal to be added to the signal at the second output terminal, the third and fourth sampling circuits not being simultaneously active and the third control loop being connected to the output terminal of the fourth adder stage, or is preferably characterized in that the third sampling circuit is connected to the comparison stage and that the second and third sampling circuits are not simultaneously active.

The circuit according to the invention may be characterized in that the sampling circuits are active during a line blanking interval of the video signal outside the occurrence of the burst of the color synchronizing signal and that the sampling circuits are active line-sequentially and be characterized in that it comprises a divider circuit for dividing the repetition frequencies of applied pulses of line frequency and for generating line-sequential pulses.

When the circuit forms part of a color encoding circuit it may be characterized in that the carrier signal is a color sub-carrier signal while the video signal is a color difference signal.

For the case of a circuit for modulating a (R-Y) color difference signal in a color encoding circuit for the PAL standard comprising a generator for generating a square-wave switching signal of half the line frequency, the circuit may be characterized in that a fifth adder stage is provided for adding together every sixth line period the pulse which operates the sampling circuit in the first control loop for the (R-Y) modulator and the switching signal of half the line frequency.

DESCRIPTION OF THE DRAWINGS

The invention will now be further explained by way of non-limitative example with reference to the accompanying Figures. Herein.

DESCRIPTION OF THE PREFERRED EMBODIMENTS

Figure 1:
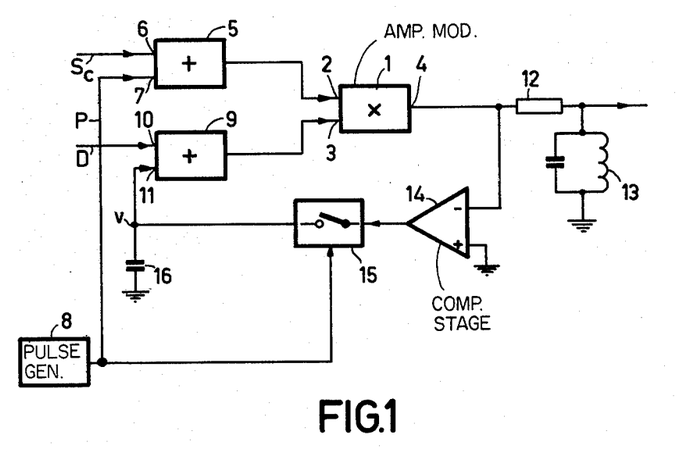
FIG. 1 shows an embodiment of an amplitude-modulation circuit with only the first control loop, this FIG. 1 serving to explain the invention.

In FIG. 1 reference numeral 1 denotes an amplitude modulator in a color encoding circuit having two input terminals 2 and 3 and an output terminal 4. Input terminal 2 is connected to the output terminal of an adder stage 5. A color sub-carrier signal Sc having a frequency of for example 3.579545 MHz (NTSC standard) or 4.43361875 MHz (PAL standard) is applied to an input terminal 6 of adder stage 5, while a measuring pulse P, which is generated by a pulse generator 8, is applied to another input terminal 7 of adder stage 5.

Input terminal 3 of the amplitude modulator 1 is connected to the output terminal of a further adder stage 9. A video signal, for example a color difference signal D, is applied to an input terminal 10 of adder stage 9, while a compensation voltage v is present across a further input terminal 11 thereof. Via a separating resistor 12, the amplitude-modulated signal present at output terminal 4 of the amplitude modulator 1 is applied to a parallel circuit 13, which is tuned to the frequency of the color sub-carrier, the amplitude-modulated signal thereafter being processed in known manner.

Terminal 4 is also connected to the inverting input terminal of a comparison stage 14. The non-inverting input terminal thereof is connected to ground, while the output terminal is connected to a sample-and-hold circuit including a switch 15 and a capacitor 16. Switch 15 is periodically operated by the pulse P coming from generator 8 and the compensation voltage v is present across capacitor 16 for application to terminal 11. It will be clear that elements 14 and 15, as they are arranged in cascade, may be interchanged.

Figure 2:
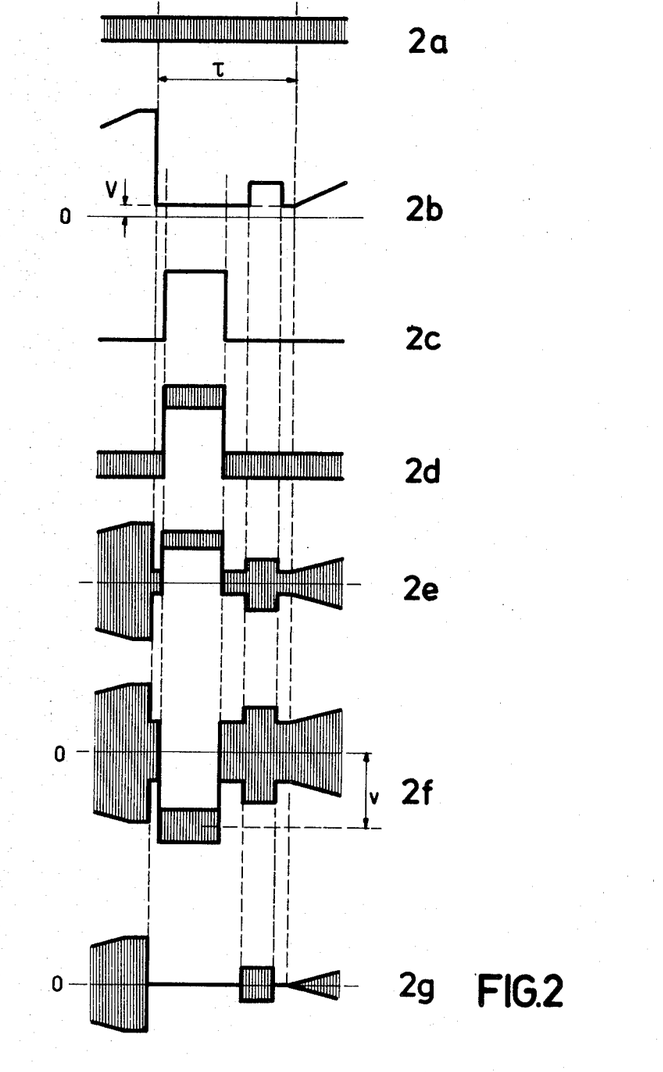
FIG. 2 shows wave forms occurring therein.

During operation, the color sub-carrier signal Sc which is applied to terminal 6, has a constant amplitude (FIG. 2a). The color difference signal D is applied to terminal 3 varies with time in the manner shown in FIG. 2b, $\tau$ indicating the line blanking period in this Figure. During this reference period the signal of FIG. 2b has a constant value V except for the period of time in which the burst of the color synchronizing signal occurs, the signal of FIG. 2b containing in that period of time a pulse which is the envelope of the burst. Prior to and after time $\tau$ the signal D is subjected to a varition which depends on the content of the recorded picture. This variation is of little importance to the invention and is therefore shown only partly in FIG. 2b.

With an ideal modulator, value V must be equal to the value for which the amplitude of the amplitude-modulated signal at terminal 4 has a value zero. In practice, however, an unbalance in the circuit causes the above-mentioned sub-carrier leakage, that is to say the amplitude is not zero and may furthermore vary with time.

A measuring pulse P, which occurs in time prior to the burst and which has a duration of some $\mu s$ (FIG. 2c) is applied to terminal 7. The output signal of stage 5 is of the shape shown in FIG. 2d. If the control loop which includes elements 14, 15 and 16 were not in operation, the waveform shown in FIG. 2e would be found at terminal 4. This waveform is obtained by multiplying the waveforms of FIGS. 2b and 2d. From this it is apparent that the signal obtained is sinusoidal and has the frequency of the subcarrier and that, consequently, the mean value thereof is zero, except during the occurrence of pulse P where the mean value is equal to the product of the value V and the mean value of the sine wave which, in FIG. 2d, is superimposed on the pulse. From FIG. 2e it is furthermore apparent that the amplitude of the amplitude-modulated signal is unequal to zero during the time $\tau$ prior to and after the burst.

By means of comparator stage 14 the signal at terminal 4 is compared with the reference value, in this example zero, at the non-inverting terminal and each value of the signal of FIG. 2e unequal to zero is amplified and inverted. FIG. 2f shows the shape of the signal obtained at the output terminal of stage 14. As switch 15 is closed by the measuring pulse, a voltage v equal to the mean value of the signal shown in FIG. 2f, is produced across capacitor 16 during the occurrence of the pulse. Until the next sampling interval voltage v remains substantially constant and is added to the signal D.

The unbalance which causes the sub-carrier leakage may be considered to be an offset in the direct current component of the modulating signal at the modulation input terminal of an ideal modulator. When this offset is positive and the measuring pulse has been chosen to be positive, as is the case in FIG. 2c, then the offset obtained in FIG. 2e during the occurrence of the pulse is also positive. The offset shown in FIG. 2f and, consequently, also voltage v are then negative. Voltage v is substracted from the offset at terminal 3 causing the amplitude of the color sub-carrier signal in the signal at terminal 4 to become smaller during the occurrence of pulse P, while voltage v becomes less negative. After a number of cycles of pulse P, depending on the time constant of the sample-and-hold circuit, the control loop so adjusts itself that, during the occurrence of pulse P, the signal at terminal 4 assumes essentially the value of the reference voltage i.e. zero in this example, at the non-inverting terminal of comparator stage 14 and that the resulting offset at terminal 3 is zero. This implies that the signals at terminals 10 and 11 have the same absolute value and are of the opposite signs during the occurrence of the measuring pulse and that the amplitude of the color sub-carrier signal at terminal 4 is substantially zero during the same period of time. As the described situation occurs for a certain value of the signal of FIG. 2b, the amplitude at terminal 4 is also substantially zero, each time the signal of FIG. 2b assumes this specific value. This holds in particular during the time $\tau$ prior to and after the measuring pulse and prior to and after the color burst, as well as in time intervals, not shown, in which the color difference signal does not contain color information.

In these circumstances the signal at terminal 4 is of the shape shown in FIG. 2g and is substantially free from sub-carrier leakage. This signal may yet show an asymmetry, the positive and the negative portions of the waveform then being unequal. This fault is eliminated in known manner by means of circuit 13.

When now the offset at terminal 3 is negative, while the measuring pulse is still positive, then the offset obtained in FIG. 2e during the occurrence of the pulse is still negative, so that the voltage v is positive. So the resultant offset at terminal 3 becomes less negative and the control achieves the same result as described in the foregoing. From this it will be apparent that the d.c. offset added to the carrier signal by means of the measuring pulse must be positive in the case of the control loop shown. The inverting action of stage 14 must particularly be taken into consideration. The polarity of the offset applied to terminal 7 must be chosen so that the action of the control results in a negative feedback to terminal 11, while the value of the applied offset must be sufficiently large to achieve that the fault to be corrected has little influence, but it must not be that large that it prevents the modulator from operating properly.

As mentioned above, the offset must be added to the sub-carrier signal and not to the color difference signal. Thus, if the offset were added to the color difference signal it would produce a symmetrical sine wave after modulation and if the pulse duration of the measuring pulse were not equal to an integral number of periods of the sine function, then an error would be introduced which might be very considerable. When the offset is added to the sub-carrier signal a similar error is introduced which is, however, much smaller provided the pulse has a sufficiently large amplitude and provided the loop gain is large enough. It will also be noted that the carrier signal Sc present at terminal 6 during the occurrence of the pulse has no function in the control.

Adder stage 5 may therefore be replaced by a change-over switch which is operated by the pulse and by means of which terminal 2 is supplied with either the sub-carrier signal, or, more specifically during the occurrence of the pulse, with a direct current signal, as a result of which the above-mentioned error, that is to say the minor error introduced by the sub-carrier present during the occurrence of the pulse, is completely eliminated.

In the case of FIG. 1 and also in the case just described, it is not necessary for the measuring pulse to have the line frequency: the repetition frequency thereof may namely be lower. The only requirement the circuit must satisfy is that the charge of capacitor 16 is retained between two sampling intervals, which can be improved by including an isolating stage in the connection between capacitor 16 and terminal 11. It will be clear that the direct current offset applied to terminal 7 need not be pulse-shaped. When, namely, such an offset is present during the entire line period the amplitude of terminal 4 is yet made equal to zero during the occurrence of the pulse, due to the action of sample-and-hold circuit 15, 16. A signal of video frequency is then indeed generated at terminal 4 and it can be eliminated in a simple manner by means of frequency-selective means, for example by means of circuit 13.

In the foregoing it was mentioned that the value of the reference voltage at the non-inverting terminal of comparison stage 14 is zero. From this it follows that the voltage at terminal 4 is substantially zero at the occurrence of the pulse which closes switch 15. However, this is only applicable when modulator 1 is of such a construction that the output voltage terminal is zero when the modulating signal has the value at which the output signal is independent of the value of the signal at the carrier input terminal. When the modulator is of such a construction that, in the absence of a control, the output voltage of the modulator does not have zero value when the modulating signal has the above-mentioned value, then the reference voltage must be given a value which is somewhat higher than the value of the output voltage in the above-mentioned circumstances. This also determines the direct current level at terminal 4.

As the direct current offset at terminal 3 has automatically become almost zero because of the action of the circuit shown in FIG. 1, a clamping circuit for fixing the direct current level of the color different signal is not required. It may, however, happen that modulator 1 has a variable direct current unbalance at output terminal 4, while the control loop, owing to the non-infinite gain thereof, introduces a slight direct current error. A direct current error may alternatively be caused by one or more amplifiers, not shown in FIG. 1. For these reasons the reference voltage at the non-inverting terminal of comparison stage 14 would be variable or at least adjustable. For the circuit shown in FIG. 3 a constant reference voltage can be used which is furthermore independent of the properties of the modulator. Components in FIG. 3 which correspond to those of FIG. 1 have been given the same reference numerals.

Figure 3:
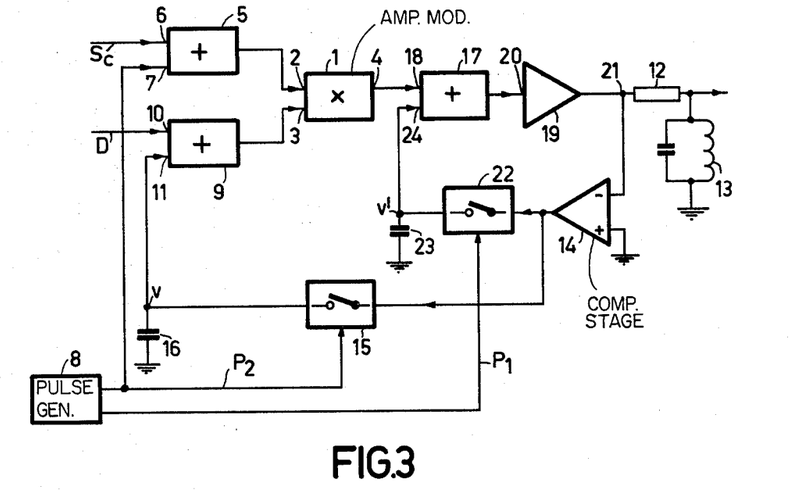
FIG. 3 shows an embodiment of the circuit according to the invention.

In FIG. 3, terminal 4 of the amplitude modulator 1 is connected to an input terminal 18 of an adder stage 17. The output terminal thereof is connected to the input terminal 20 of a non-inverting amplifier 19, whose output terminal 21 is connected to resistor 12 and to the inverting input terminal of comparison stage 14. The output terminal of stage 14 is connected to sample-andhold circuit 15, 16 and to a further sample-and-hold circuit having a switch 22 and a capacitor 23, which is connected to a second input terminal 24 of adder stage 17. Switch 22 is periodically operated by a pulse $P_1$ generated by pulse generator 8, while switch 15 is also periodically operated by a pulse $P_2$ generated by generator 8, this pulse $P_2$ also being applied to terminal 7. Pulses $P_1$ and $P_2$ occur during reference intervals which occur in the same manner as pulse P in FIG. 2c, but they must not coincide.

When in the output circuit of modulator 1 a direct current offset occurs, then, in the absence of the control loop which comprises elements 14, 22 and 23, a direct voltage level would be superimposed on the signals at terminal 21 shown in FIG. 2g. The operation of this loop produces across capacitor 23 a voltage v' which has a polarity which is the opposite of the polarity of this voltage level and after a number of periods of pulse $P_1$ the loop adjusts itself thus that the d.c. voltage level at terminal 21 has substantially the same value as the reference voltage, zero in this example, at the non-inverting terminal of comparator stage 14. In this manner a d.c. voltage level at terminal 21 is kept at a constant, predetermined value. This value may be determined by the d.c. voltage level of the further stages, not shown in FIG. 3, which are connected to resistor 12 and the circuit 13.

The control loop, comprising elements 14, 15 and 16 operates in FIG. 3 in the same manner as the corresponding control loop in FIG. 1. In the equilibrium condition of the loop, the signal at terminal 4 is, during the occurrence of pulse $P_2$, independent of the sub-carrier signal at terminal 6 and of the value of the reference voltage at the non-inverting terminal of stage 14. When the signal at terminal 4 varies for some reason or another, then this variation is processed thus by the control loop comprising elements 14, 22 and 23 such that the output signal at terminal 21 is not influenced by it. A signal which is amplified and inverted with respect to the signal at terminal 21 is obtained from the output terminal of comparator stage 14. During the occurrence of pulse $P_1$, the voltage v' of capacitor 23 is available at the output terminal of comparator stage 14 and during the occurrence of pulse $P_2$, the voltage v of capacitor 16 is available at the output terminal of comparator stage 14. Voltage v' depends on the reference voltage but voltage v does not. These voltages are therefore unequal. If the reference voltage is given a value other than zero, then voltage v' and the d.c. voltage level at terminal 21 assume another value, while voltage v and the signal at terminal 4 are not changed. For simplicity, the two loop gains are assumed to be infinitely large.

Pulses $P_1$ and $P_2$ can be generated line-sequentially, that is to say that during a line blanking period, pulse $P_1$ is applied to switch 22 and that pulse $P_2$ is applied to switch 15 during the next following line blanking period. As was the case in FIG. 1, a lower repetition frequency may, however, be opted for. At the same manner as in FIG. 1, a direct current offset is introduced in the signal applied to terminal 2, at least during the occurrence of pulse $P_2$ but not during the occurrence of pulse $P_1$. For the described circuit, this deviation must be positive in order to obtain a negative feedback. It will be clear that the same result may be obtained when a negative direct current offset is introduced, at least during the occurrence of pulse $P_1$ but not during the occurrence of pulse $P_2$.

Figure 4:
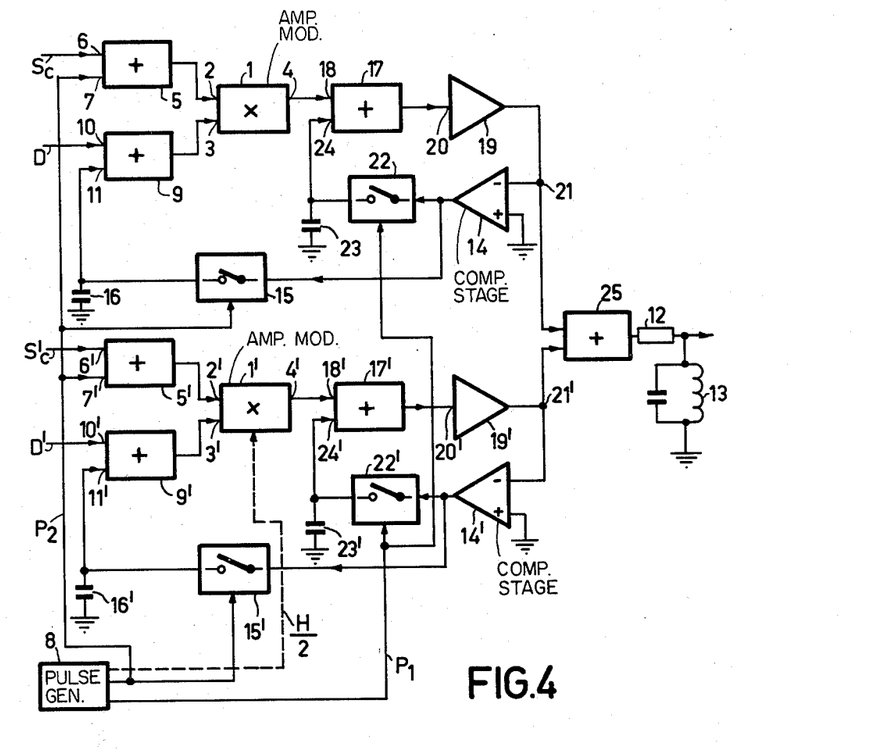
FIG. 4 shows an embodiment of a color encoding circuit embodying the circuit according to the invention.

FIG. 4 shows a circuit for a NTSC- or PAL-encoding circuit, in which consequently two color difference signals are processed. In FIG. 4, the portion comprising elements 1 to 7 inclusive, 9 to 11 inclusive and 14 to 24, inclusive, corresponds to the circuit shown in FIG. 3 and this portion is used to modulate the color sub-carrier wave with the color difference signal D, i.e. for example, the (B-Y) signal for the PAL standard or the I-signal for the NTSC standard. A circuit portion comprising elements 1' to 7' inclusive, 9' to 11' inclusive and 14' to 24' inclusive, and having the same construction as the first-mentioned portion, is used for modulation with the other color difference signal D', which here refers to modulation with the Q-signal of the NTSC standard. For the (R-Y) signal of the PAL standard, measures must be taken to ensure the prescribed line-sequential inversion thereof, which is realized by means of a pulse H/2 of half the line frequency, which is aplied to modulator 1'. This is shown in FIG. 4 by means of a broken line.

The output terminal 21 of the (B-Y) or the I-portion, respectively, of the circuit shown in FIG. 4 is connected to an input terminal of an adder stage 25. The output terminal 21' of the (R-Y) or Q-portion, respectively, is connected to another input terminal of the adder stage 25. Elements 12 and 13 have further been provided at the output terminal of stage 25 and the total modulated output signal is available at the junction of these elements. For this purpose 90° phase shifted color subcarrier signals Sc and Sc' are applied to terminals 6 and 6', while pulses $P_1$ and $P_2$, which are similar to those in FIG. 3 are operative therein in the same way.

The circuit of FIG. 4 has the drawback that two amplifiers 19 and 19' and two comparator stages 14 and 14', which in practice may have different properties, are required. This may introduce errors. The circuit of FIG. 5 does not have this drawback as the two portions thereof have the control loop for fixing the direct current level at the output terminal of the circuit in common. Elements in FIG. 4 which correspond to those in FIG. 5 have been given the same reference numerals.

Figure 5:
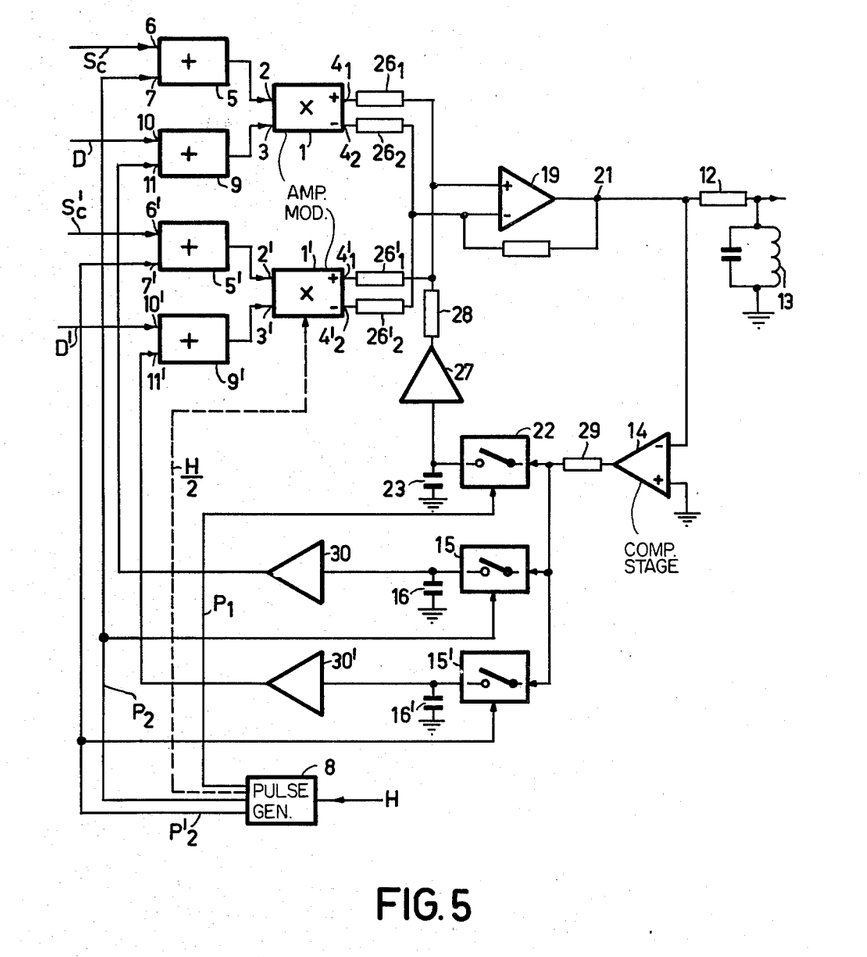
FIG. 5 shows a second, preferred embodiment of a color encoding circuit embodying the circuit according to the invention

Modulators 1 and 1' are constructed symmetrically in FIG. 5. The non-inverting output terminals $4_1$ and $4'_1$ respectively, of modulators 1 and 1', respectively, are connected to a non-inverting input terminal of amplifier 19 via resistors $26_1$ and $26'_1$, respectively, while the inverting output terminals $4_2$ and $4'_2$, respectively, of modulators 1 and 1', respectively, are connected to an inverting input terminal of amplifier 19 via resistors $26_2$ and $26'_2$, respectively. Capacitor 23 is connected to the non-inverting input terminal of amplifier 19 via a non-inverting buffer amplifier 27 and a resistor 28. A separating resistor 29 is provided between comparator stage 14 and switch 22. Switches 15 and 15' are both connected to the junction of switch 22 and resistor 29. Buffer amplifiers 30 and 30', respectively, are included in the leads between capacitors 16 and 16', respectively, and terminals 11 and 11', respectively. Resistor 29 is used in conjunction with further resistances, for example, the output resistance of stage 14, and in conjunction with capacitors 23, 16 or 16' to determine the time constant of the three sample-and-hold circuits. In all other respects the circuit shown in FIG. 5 is the same that of FIG. 4.

The control loop comprising elements 14, 22 and 23, operates in the same way as the corresponding loop of FIG. 3. For this purpose switch 22 is operated by the same pulse $P_1$ as in FIG. 3. The output signals of modulators 1 and 1' and also the compensation voltage produced across capacitor 23 are added together by means of resistors $26_1$, $26'_1$, $26_2$, $26'_2$ and 28. In the same way as in FIG. 3 the d.c. voltage level of the modulated signal is fixed at the output terminal of amplifier 19, and that at substantially the value, zero in this example, of the reference voltage at the non-inverting terminal of comparator stage 14.

Switch 15 is operated by a pulse $P_2$, which is also applied to terminal 7 and which occurs one line period later than pulse $P_1$. The control loop comprising elements 14, 15 and 16 eliminates in the manner explained hereinbefore the subcarrier leakage of modulator 1. In a similar manner switch 15' is operated by a pulse $P'_2$ which is also applied to terminal 7' and which occurs one line period later than in pulse $P_2$. The control loop comprising elements 14, 15' and 16' eliminates the subcarrier leakage of modulator 1'.

Figure 6:
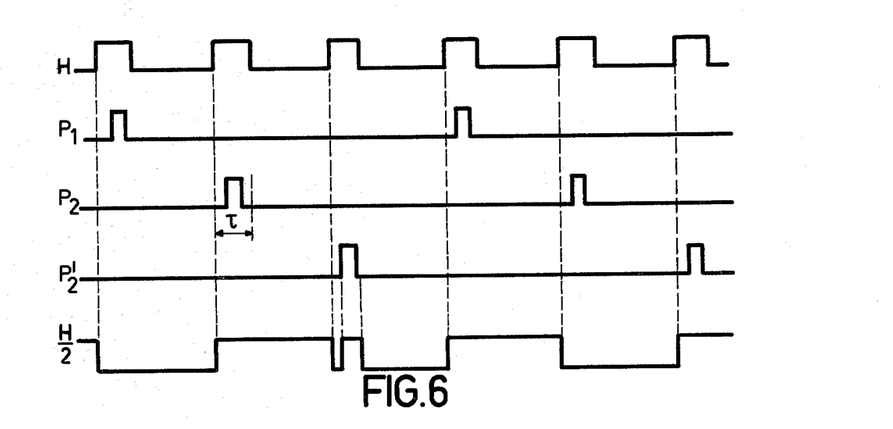
FIG. 6 shows waveforms occurring therein.

Pulse generator 8 comprises a divider circuit which is supplied with pulses H of line frequency and which divides the repetition frequency thereof by three, causing the pulse trains $P_1$, $P_2$ and $P'_2$ to be generated line-sequentially (see FIG. 6 in which time $\tau$ has been shown once). Generator 8 also generates a signal H/2 of half the line frequency for the (R-Y) change-over for the PAL standard, this signal not being utilized when the NTSC standard is used. As the repetition frequency of pulse $P'_2$ is equal to one third the line frequency, signal H/2 must have the shape shown in FIG. 6. Pulse $P'_2$ is added to the original square-wave switching signal at half the line frequency every 6 lines. For simplicity, FIG. 5 does not show the adder stage which is then required. No (R-Y) inversion is thus effected for the offset applied to terminal 2', which would cause the control operating by means of elements 14, 15' and 16' to become a positive feedback. It will be obvious that the same applies for the signal H/2 in FIG. 4. Alternatives are possible, for example the operation of amplifier 30' may be reversed every six line periods.

Finally, it should be noted that all the described portions of the modulator circuit according to the invention, the capacitors and circuit 13 excepted, can be advantageously integrated in a semiconductor body.

What is claimed is:

1. An amplitude modulator circuit for modulating a video signal having periodically occurring reference signal portions on a carrier signal, comprising a modulator having a carrier input terminal for receiving the carrier signal, a modulation input terminal for receiving the video signal and an output terminal for supplying the amplitude modulated signal obtained, said amplitude modulator circuit further comprising a control loop which is coupled to the output terminal of the modulator and includes a sampling circuit which is active during reference signal intervals, said control loop generating a direct current compensation signal to be added to the video signal, characterized in that the signal at the modulation input terminal of the modulator has a value for which the signal at the output terminal of the modulator is substantially independent of the signal at the carrier input terminal of the modulator during the period of time in which the sampling circuit is active, and that the circuit also comprises an adder stage connected to the output terminal, and a second control loop which includes a second sampling circuit which is active during reference signal intervals, said second control loop generating a second direct current compensation signal to be added to the signal at the output terminal of the modulator, the first control loop being connected to the output terminal of the adder stage.

2. A circuit as claimed in claim 1, characterized in that the first control loop also comprises a comparison stage a first input terminal of which carries a reference signal, this comparison stage having a second input terminal and an output terminal is included in the first control loop, the reference signal having a value which is substantially equal to the value of the signal at the output terminal which is substantially independent of the signal at the carrier input terminal of the modulator.

3. A circuit as claimed in claim 1, characterized in that the signal at the carrier input terminal has at least during the period of time of which the first sampling circuit is active a first direct current level of such a polarity that the first control loop causes a negative feedback.

4. A circuit as claimed in claim 1, characterized in that the said first and second sampling circuits are not simultaneously active.

5. A circuit as claimed in claim 3 or 4, characterized in that the signal at the carrier input terminal has at least during the period of time in which the second sampling circuit is active a second direct current level of such a polarity that the second control loop causes a negative feedback, the second direct current level deviating from the first direct current level.

6. A circuit as claimed in claim 2, characterized in that the second input terminal of the comparison stage is coupled to the output terminal of the added stage, while the output terminal of the comparison stage is connected to the two sampling circuits.

7. A circuit as claimed in claim 1, characterized in that the first and second sampling circuits are sample-and-hold circuits.

8. A circuit as claimed in claim 7, characterized in that it comprises a second adder stage for adding a pulse-shaped measuring signal to the carrier signal during the period of time in which the first sampling circuit is active.

9. A circuit as claimed in claim 7, characterized in that it comprises a change-over switch for applying a direct current level to the carrier input terminal during the period of time in which the first sampling circuit is active and for applying the carrier signal to the said input terminal during the period of time in which the first sampling circuit is not active.

10. A circuit as claimed in claim 1, comprising a second amplitude modulator circuit for modulating a second video signal having periodically occurring reference signal portions on a second carrier signal, comprising a second modulator having a second carrier input terminal for receiving the second carrier signal, a second modulation input terminal for receiving the second video signal and a second output terminal for supplying the second amplitude modulated signal obtained, further comprising a third adder stage for adding together the said first and second amplitude-modulated signals, characterized in that it comprises a third control loop which is coupled to the second output terminal and includes a third sampling circuit which is active during reference signal intervals, said third control loop generating a third direct current compensation signal to be added to the second video signal, the signal at the second modulation input terminal having a value for which the signal at the second output terminal is substantially independent of the signal at the second carrier input terminal during the period of time in which the third sampling circuit is active.

11. A circuit as claimed in claim 10, characterized in that it comprises a fourth adder stage connected to the second output terminal and a fourth control loop including a fourth sampling circuit which is active during reference signal intervals, said fourth control loop generating a fourth direct current compensation signal to be added to the signal at the second output terminal, the third and fourth sampling circuits not being simultaneously active and the third control loop being connected to the output terminal of the fourth adder stage.

12. A circuit as claimed in claim 10, characterized in that the third sampling circuit is connected to the comparison stage and that the second and the third sampling circuits are not simultaneously active.

13. A circuit as claimed in claim 1, characterized in that the sampling circuits are active during a line blanking interval of the video signal, outside the occurrence of the burst of the color synchronizing signal.

14. A circuit as claimed in claim 13 or 12, characterized in that the sampling circuits are active line-sequentially.

15. A circuit as claimed in claim 14, characterized in that it comprises a divider circuit for dividing the repetition frequency of applied pulses of line frequency and for generating line-sequential pulses.

16. A circuit as claimed in claim 10, characterized in that the carrier signal is a color subcarrier signal while the video signal is a color difference signal.

17. A circuit as claimed in claim 16 for modulating a (R-Y) color difference signal in a color encoding circuit for the PAL standard, comprising a generator for generating a square-wave switching signal of half the line frequency, characterized in that it comprises a fifth adder stage for adding together every sixth line period the pulse which operates the sample-and-hold circuit in the first control loop for the (R-Y) modulator and the switching signal of half the line frequency.

* * * * *

UNITED STATES PATENT AND TRADEMARK OFFICE
CERTIFICATE OF CORRECTION

PATENT NO. : 4,354,200
DATED : October 12, 1982
INVENTOR(S) : Henricus W.G. Haenen & Robertus S.N.M. Heusten It is certified that error appears in the above—identified patent and that said Letters Patent is hereby corrected as shown below:

Title Page Item (30) Foreign Application Priority Data 7907177 should be 7909177

Signed and Sealed this

Eighth Day of February 1983

[SEAL]

Attest:

GERALD J. MOSSINGHOFF

Attesting Officer     Commissioner of Patents and Trademarks